(12) United States Patent
Lyu

(10) Patent No.: US 12,470,419 B2
(45) Date of Patent: Nov. 11, 2025

(54) INTERACTION METHOD AND APPARATUS, AND ELECTRONIC DEVICE

(71) Applicant: BEIJING BYTEDANCE NETWORK TECHNOLOGY CO., LTD., Beijing (CN)

(72) Inventor: Jing Lyu, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 69 days.

(21) Appl. No.: 18/017,250

(22) PCT Filed: Jun. 15, 2021

(86) PCT No.: PCT/CN2021/100127
§ 371 (c)(1),
(2) Date: Jan. 20, 2023

(87) PCT Pub. No.: WO2022/022127
PCT Pub. Date: Feb. 3, 2022

(65) Prior Publication Data
US 2023/0291591 A1   Sep. 14, 2023

(30) Foreign Application Priority Data
Jul. 27, 2020   (CN) .......................... 202010735352.7

(51) Int. Cl.
*H04L 12/18* (2006.01)
(52) U.S. Cl.
CPC ...... *H04L 12/1818* (2013.01); *H04L 12/1822* (2013.01); *H04L 12/1827* (2013.01)

(58) Field of Classification Search
CPC ............ H04L 12/1818; H04L 12/1822; H04L 12/1827; H04L 65/403; H04L 65/4038; H04L 65/765; G06F 40/263
See application file for complete search history.

(56) References Cited

U.S. PATENT DOCUMENTS

| | | | |
|---|---|---|---|
| 8,631,069 B2 * | 1/2014 | Maes | H04L 65/403 709/204 |
| 9,836,458 B1 * | 12/2017 | Jiang | H04L 12/1822 |
| 9,967,520 B1 | 5/2018 | Rensburg et al. | |
| 2008/0212499 A1 | 9/2008 | Maes | |
| 2014/0136630 A1 | 5/2014 | Siegel et al. | |

(Continued)

FOREIGN PATENT DOCUMENTS

| | | |
|---|---|---|
| CN | 102724047 A | 10/2012 |
| CN | 103200223 A | 7/2013 |

(Continued)

OTHER PUBLICATIONS

International Patent Application No. PCT/CN2021/100127; Int'l Search Report; dated Sep. 22, 2021; 3 pages.

(Continued)

*Primary Examiner* — Muhammad Raza
(74) *Attorney, Agent, or Firm* — BakerHostetler

(57) ABSTRACT

An interaction method is provided, which includes: generating a target conference code matching a target language, and sending the target conference code to the target user. The target language is determined according to a target user, and the target conference code indicates a multimedia conference.

14 Claims, 4 Drawing Sheets

(56) References Cited

U.S. PATENT DOCUMENTS

| | | | | |
|---|---|---|---|---|
| 2015/0172333 A1* | 6/2015 | Lindstrom | ............ | H04L 65/403 |
| | | | | 370/261 |
| 2017/0235724 A1 | 8/2017 | Grewal | | |
| 2018/0089174 A1* | 3/2018 | Jiang | .................. | H04L 12/1822 |
| 2019/0385127 A1* | 12/2019 | Hashimoto | ........ | G06Q 10/1095 |
| 2020/0106813 A1* | 4/2020 | Vendrow | ............. | H04L 65/4015 |
| 2020/0349230 A1* | 11/2020 | Yoshioka | ................ | G06F 40/58 |

FOREIGN PATENT DOCUMENTS

| | | | |
|---|---|---|---|
| CN | 103973461 A | | 8/2014 |
| CN | 109558199 A | | 4/2019 |
| CN | 110472250 A | | 11/2019 |
| CN | 110574056 A | | 12/2019 |
| CN | 111061753 A | | 4/2020 |
| CN | 111224792 A | | 6/2020 |
| CN | 111447191 A | | 7/2020 |
| CN | 111935111 A | | 11/2020 |

OTHER PUBLICATIONS

Written Opinion for International Application No. PCT/CN2021/100127, mailed Sep. 22, 2021, 9 Pages with English translation.

* cited by examiner

INTERACTION METHOD AND APPARATUS, AND ELECTRONIC DEVICE

REFERENCE TO RELATED APPLICATION

This application is the national phase of International Patent Application No. PCT/CN2021/100127, titled "INTERACTION METHOD AND APPARATUS, AND ELECTRONIC DEVICE", filed on Jun. 15, 2021, which claims priority to Chinese Patent Application No. 202010735352.7, titled "INTERACTION METHOD AND APPARATUS, AND ELECTRONIC DEVICE", filed on Jul. 27, 2020, is both of which are incorporated herein by reference in its their entireties.

FIELD

The present disclosure relates to the field of Internet technology, and in particular to an interaction method, an interaction apparatus and an electronic device.

BACKGROUND

With the development of the Internet, more and more users use functions of terminal devices to facilitate daily work and life. For example, users can have online multimedia conferences with other users through terminal devices. Through online multimedia conference, users can perform long-distance interaction, and can have conferences without gathering in the same place. Therefore, multimedia conferences do not have limitations on locations and spaces, compared with the traditional face-to-face conferences.

SUMMARY

This summary is provided to introduce the idea in a simplified form. The idea will be described in detail in the following description. This summary is neither intended to identify key features or essential features of the claimed technical solution, nor intended to be used to limit the scope of the claimed technical solution.

The embodiments of the present disclosure provide an interaction method, an interaction apparatus and an electronic device.

In a first aspect, the embodiments of the present disclosure provide an interaction method applied to a server. The method includes: generating a target conference code matching a target language, where the target language is determined according to a target user, and the target conference code indicates a multimedia conference; and sending the target conference code to the target user.

In a second aspect, the embodiments of the present disclosure provide an interaction method applied to a terminal device. The method includes: sending a conference code generation request including an identifier of a target user to a server, where the conference code generation request is used to request generation of a target conference code indicating a multimedia conference, where the server sends the target conference code to the target user, the target conference code matches a target language determined according to the target user.

In a third aspect, the embodiments of the present disclosure provide an interaction apparatus, including: a sending unit that sends a conference join request to a server in response to detecting a predefined conference join operation, where the conference join request includes a conference identifier. The server, in response to receiving the conference joining request, performs the following verification process: determining an initiating object identifier of the multimedia conference indicated by the conference identifier; determining, based on the initiating object identifier, whether a joining object performing the conference joining operation has a first permission, where the first permission represents permitting the joining object to enter the conference without exposing its identity to the server; controlling, in response to determining that the object has the first permission, the joining object to join the multimedia conference as a participant.

In a fourth aspect, the embodiments of the present disclosure provide an interaction apparatus, including: a sending unit that sends a conference join request to a server in response to detecting a predefined conference join operation, where the conference join request includes a conference identifier. The server, in response to receiving the conference joining request, performs the following verification process: determining an initiating object identifier of the multimedia conference indicated by the conference identifier; determining, based on the initiating object identifier, whether a joining object performing the conference joining operation has a first permission, where the first permission represents permitting the joining object to enter the conference without exposing its identity to the server; controlling, in response to determining that the object has the first permission, the joining object to join the multimedia conference as a participant.

In a fifth aspect, the embodiments of the present disclosure provide an electronic device, which includes: one or more processors; and a storage device for storing one or more programs. The one or more programs, when being executed by the one or more processors, cause the one or more processors to perform the interaction method as described in the first aspect.

In a sixth aspect, the embodiments of the present disclosure provide a computer-readable medium storing a computer program. The program, when being executed by a processor, performs the interaction method as described in the first aspect.

With the interaction method, the interaction apparatus and the electronic device provided by the embodiments of the present disclosure, a target conference code matching a target language is generated, and then the target conference code is sent to the target user, where the target language is determined according to a target user, and the target conference code indicates a multimedia conference. Therefore, first the target conference code received by the target user can be adapted to the language that the target user is familiar with, so as to improve the convenience of the target user using the target conference code to join a multimedia conference. In some embodiments of the present disclosure, since the conference codes can be generated in various languages, the number of conference codes that can be generated is increased. On one hand, the conference codes can have a short length while avoiding the security problem. On the other hand, it is unnecessary to recycle the conference numbers, reducing the complexity of implementations.

BRIEF DESCRIPTION OF THE DRAWINGS

The above and other features, advantages and aspects of various embodiments of the present disclosure will become more clear when taken in conjunction with the accompanying drawings and with reference to the following detailed description. Throughout the drawings, the same or similar reference numbers refer to the same or similar elements. It

DETAILED DESCRIPTION

Figure 1:
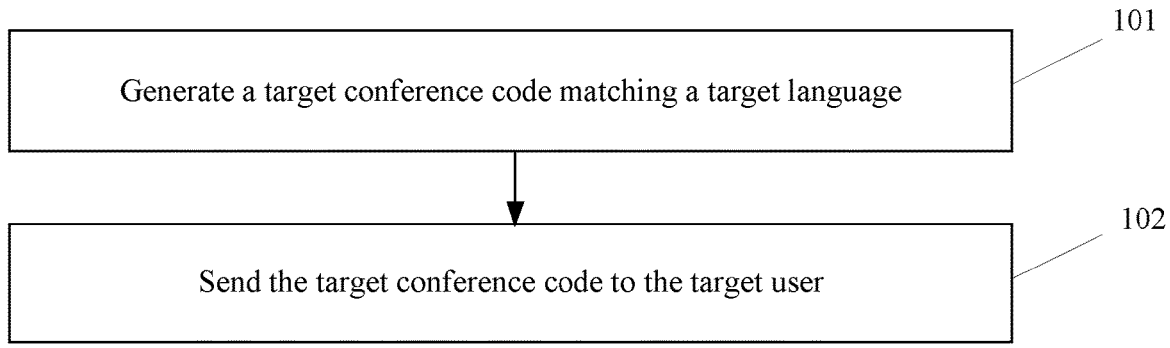
FIG. 1 is a flowchart of an interaction method according to an embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as being limited to the embodiments set forth herein. The embodiments are provided for a more thorough and complete understanding. It should be understood that the drawings and embodiments of the present disclosure are only provided as examples, and are not intended to limit the protection scope of the present disclosure.

It should be understood that the various steps described in the method embodiments of the present disclosure may be performed in different orders and/or in parallel. Furthermore, method embodiments may include additional steps and/or omit an illustrated step. The scope of the present disclosure is not limited in this regard.

As used herein, the terms "including" and "comprising" and variations thereof are non-exclusive, i.e., meaning "including but not limited to". The term "based on" means "at least partially based on". The term "an embodiment" means "at least one embodiment", the term "another embodiment" means "at least one another embodiment", and the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the modifications of "a" and "a plurality" mentioned in the present disclosure are illustrative rather than restrictive, and those skilled in the art should understand that unless clearly indicated otherwise, they should be understood as "one or more".

The names of messages or information exchanged between multiple devices in the embodiments of the present disclosure are only for illustrative purposes, and are not intended to limit the scope of these messages or information.

FIG. 1 shows a flowchart of an interaction method according to an embodiment of the present disclosure. This interaction method is applied to a server. As shown in FIG. 1, the interaction method includes the following steps S101 and S102.

Step 101: Generate a target conference code matching a target language.

In this embodiment, a first execution subject (for example, a server) of the interaction method generates a target conference code matching the target language.

In this embodiment, the target language is determined according to a target user.

In some application scenarios, the target user may be a user who requests to establish a multimedia conference. The multimedia conference requested by the target user may be an instant conference or a reserved conference. The instant conference refers to a conference that starts immediately when being initiated. The reserved conference refers to a conference that sends an invitation when being initiated and starts at a future scheduled time. As an example, user A requests the server to establish a multimedia conference, and the server determines user A as the target user.

In some application scenarios, the target user may be a user invited to join the established multimedia conference. It can be understood that the target user in this scenario is not the creator of the established multimedia conference. For example, for the multimedia conference established by user A, user A may share relevant information of the multimedia conference (such as a conference code) with user B to invite user B to join the multimedia conference. In this example, user B may be the target user. For another example, if user B invites user C to join the established multimedia conference (established by user A), user C may be the target user.

In this embodiment, the target language is determined according to the target user, including but not limited to at least one of the following: determining the language used by the target user as the target language; determining a mapping language of the target user's language as the target language; and determining, in response to the uncertainty of the target user's language, a preset universal language as the target language.

In some application scenarios, the first execution subject may preset the mapping relationship between languages. For example, if the first execution body does not support language X, the first execution body may map language X to a supported language Y. In this case, language Y can be understood as the mapping language of language X.

It should be noted that setting the mapping language can improve the adaptability to users who use languages that are not supported by the first execution subject while reducing the supported languages, so as to make the target language adapt to the languages that the target user is familiar with. As a result, it is balanced between the number of supported languages (i.e., the amount of work to generate conference codes) and the adaptability to users.

It should be noted that the language used by the target user can be determined in various ways, which is not limited herein.

In some embodiments, the target language is determined according to predefined language indication information of the target user. Predefined scenario information can be used to indicate the language used by the user.

Predefined scenario information may include a device language parameter, an application language parameter, and the like. It can be understood that the device language parameter indicates a default language used by the terminal device of the target user, and the application language parameter indicates a default language used by one or more applications of the target user.

In some embodiments, the target language is specified by the user. As an example, if the target user includes the user requesting the establishment of a multimedia conference, the target user may specify a language of the multimedia conference. Alternatively, the target user may specify a language used by the target user, and the language specified by the target user is determined as the target language.

In some application scenarios, the languages supported by the first execution subject may be preset.

As an example, if determining that the language used by the target user is a language supported by the first execution subject, the language used by the target user is determined as the target language.

In some application scenarios, if failing to determine the language used by the target user, a preset universal language is determined as the target language. Optional, a specific language type of the preset universal language may be preset according to actual application scenarios, which is not limited herein.

In this embodiment, the target conference code is used to indicate a multimedia conference. The target conference code is bound with the multimedia conference, and uniquely indicates the multimedia conference.

The server is used to support the multimedia conference. The multimedia conference may be an online multimedia conference. The multimedia conference includes at least one of the following: an audio conference and an audio and video conference. It can be understood that the audio and video conference refers to a conference including both audio interactions and video interactions. In some embodiments, the multimedia conference is an audio and video conference.

In this embodiment, the multimedia conference application may be an application by which the server provides a multimedia conference service, which may have various types and is not limited herein. For example, the application may be an instant video conference application, a communication application, a video playback application, a mail application, or the like.

In some application scenarios, the target conference code may be used to request to join a multimedia conference. As an example, a user enters the target conference code at the multimedia conference entrance to join the multimedia conference indicated by the target conference code.

The target conference code matching the target language may include the target conference code including text in the target language. Optionally, step 101 may include generating the target conference code in the target language. Optionally, the target conference code may further include symbols commonly used in various languages, such as numbers.

In this embodiment, the generation of the target conference code matching the language can be achieved by a preset algorithm for generating a conference code for various languages. The specific process of the algorithm is configured according to actual application scenarios, and is not limited herein.

Step 102: Send the target conference code to the target user.

In this embodiment, the first execution subject sends the target conference code to the target user.

Generally, the target user can join the multimedia conference through the conference code after receiving the target conference code.

With the interaction method, provided by this embodiment of the present disclosure, a target conference code matching a target language is generated, and then the target conference code is sent to the target user, where the target language is determined according to a target user, and the target conference code indicates a multimedia conference. Therefore, first the target conference code received by the target user can be adapted to the language that the target user is familiar with, so as to improve the convenience of the target user using the target conference code to join a multimedia conference. In some embodiments of the present disclosure, since the conference codes can be generated in various languages, the number of conference codes that can be generated is increased. On one hand, the conference codes can have a short length while avoiding the security problem. On the other hand, it is unnecessary to recycle the conference numbers, reducing the complexity of implementations.

In contrast, in a multimedia conference in the conventional technology, a string of digits (generally 9 digits) is used to identify a conference and is used to participate in a specified conference. The advantages of the digital identification are simple, universal, easy to identify and input. However, the nine-digit number has an insufficient capacity (one billion), and thus has the following problems. First, there is a security problem. A malicious person may search staring up and down from a known conference number, so as to find another valid conference number within a certain time, or may use stronger computing power to cover the entire capacity. Secondly, due to the insufficient capacity, the conference numbers needs to be recycled and reused, which brings complexity of implementations. In other words, if the conference numbers are not recycled and reused, there will be no conference number available for multimedia conferences. Thirdly, although the capacity can be increased by increasing the number of digits, it will result in m more complex identification and input, thereby affecting the user experiences.

Figure 2:
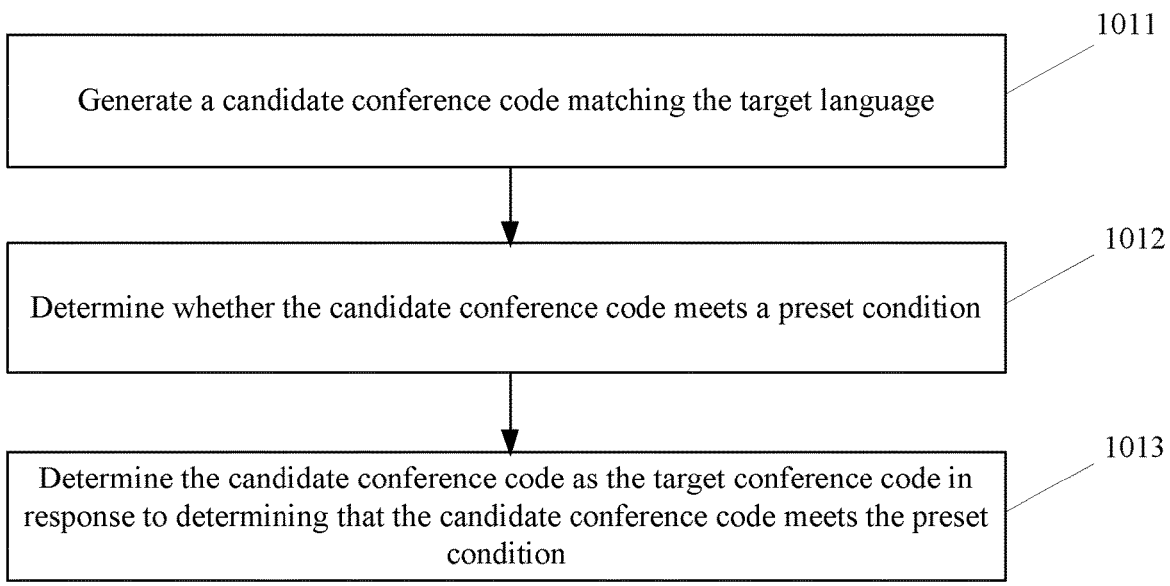
FIG. 2 is a flowchart of an optional implementation according to step 101.

In some embodiments, referring to FIG. 2, the above step 101 may include the process shown in FIG. 2, including step 1011, step 1012, and step 1013.

Step 1012: Generate a candidate conference code matching the target language.

The first executing subject may randomly generate a candidate conference code.

As an example, the above execution subject may index various words in the target language, then randomly select a preset number of indexes, and use words indicated by the selected preset number of indexes as a candidate conference code.

Step 1012: Determine whether the candidate conference code meets a preset condition.

In this embodiment, the preset condition indicates a condition that candidate conference code is required to meet. The specific preset condition can be set according to actual application scenarios, and is not limited herein.

In some embodiments, the above preset determination conditions may include a duplicate data exclusion condition. Step 1012 may include that the candidate conference code meets the duplicate data exclusion condition, in response to determining that the candidate conference code is different from each existing conference code.

The existing conference code may be a conference code already generated for the target language. The number of existing conference codes may be one or at least two. The existing conference codes may be stored in an existing conference code set. The first execution entity may search for the candidate conference code in the existing conference code set. If an existing conference code is found the same as the candidate conference code, it is determined that the candidate conference code is the same as an existing conference code. If no existing conference code is found the same as the candidate conference code, it is determined that the candidate conference code is different from each existing conference code.

It should be noted that, setting the duplicate data exclusion condition can avoid a situation that the same conference code indicates different multimedia conferences.

In some embodiments, the preset condition includes a prohibited word exclusion condition. Step 1012 may include: determining that the candidate conference code meets the prohibited word exclusion condition, in response to determining that the candidate conference code is not in a list of prohibited words corresponding to the target language.

The list of prohibited words may be preset. The list of prohibited words may include prohibited words. The list of prohibited words may be updated frequently.

It is understood that, different lists of prohibited words may be set for different languages. The prohibited words may be set according to actual application scenarios, and are not limited herein. Generally, the prohibited words may be some words that violate public orders and good morals.

Step 1013: Determine the candidate conference code as the target conference code in response to determining that the candidate conference code meets the preset condition.

Optionally, if the preset condition include at least two sub-conditions, a relationship between meeting the sub-conditions and meeting the preset condition may be set according to actual applications.

As an example, the preset condition includes the duplicate data exclusion condition and the prohibited word exclusion condition. It may be determined that the candidate conference code meets the preset condition in response to determining that the candidate conference code meets both the duplicate data exclusion condition and the prohibited word exclusion condition.

It should be noted that in step 101, the process shown in FIG. 2 may be executed once or at least twice. Specifically, in response to the determination that the candidate conference code does not meet the preset condition, the process shown in FIG. 2 may be re-executed. When re-executing, a new candidate conference code is generated in step S1012, and step 1012 and step 1013 are performed based on the new candidate conference code.

It should be noted that the speed of generating target conference codes can be improved by setting preset condition to judge candidate conference codes. Specifically, the method of first generating the candidate conference code and then judging by using the preset condition can well cooperates with the characteristic of the large capacity of the language conference code. That is, the calculation required for the judgment is small, and the probability that the candidate code meets the preset condition is high, so that the target conference code can be generated more quickly. By contrast, the method of first setting various generation conditions to directly generate conference codes that meet the generation conditions has a large calculation amount and a low computing speed.

In some embodiments, step 101 may include: selecting a target language feature category corresponding to a target conference feature category from at least one language feature category preset for the target language, selecting a target feature item corresponding to the target conference feature from the target language feature category, and generating a target conference code having the target feature item.

The target conference feature category is a category to which a target conference feature of the multimedia conference belongs.

As an example, a multimedia conference may have various predefined conference features. Predefined categories of the conference features may include, for example but not limited to, at least one of conference time and an identifier of an organization of participants.

As an example, the target conference feature may be logo "Ding" of an organization of participants. The target predefined conference feature category is the organization logo.

As an example, if the target language is Chinese, at least one language feature category for the target language may include, but is not limited to, at least one of the following: initial consonant, vowel, radical.

The language feature category includes feature items. As an example, the language feature category "initial consonant" for Chinese may include multiple specific initial consonants, such as b, p, m, and f.

In some application scenarios, the target conference feature category of the target is an organization logo, and the language feature category corresponding to the organization identifier may be the initial consonant. For the organization logo "Ding", the initial consonant "b" corresponding to the organization logo "Ding" can be selected from the initial consonants. Then, a target conference code with the initial consonant "b" is generated. For example, the initial consonant of the second word of the target conference code is "b", and the target conference code may be "N" (the Chinese word for radish).

It should be noted that by presetting multiple language feature categories for the target language, the feature items in the language feature categories can be used to establish an index for the multimedia conference, so as to improve the efficiency of searching for the multimedia conference by the first executive subject or user. In addition, this indexing method is secretive, which is difficult for a malicious person to crack, thereby improving the security of the conference.

In some embodiments, the target user includes a conference establishment user, and the target language determined by the conference establishment user is a first language. In this case, the step 101 may include generating a first conference code matching the first language in response to receiving a conference establishment request, where the first conference code indicates the multimedia conference.

It can be understood that the conference establishment user sends a conference establishment request by the client running on the first execution subject, and the first execution subject can determine the language used by the conference establishment user.

The first executing subject establishes a multimedia conference and generates a first conference code in response to receiving a conference establishment request, and then binds the first conference code to the multimedia conference.

Optionally, a unique identification code is generated for the multimedia conference. The conference codes in various languages generated for the multimedia conference are bounded with the unique identification code. Optionally, the conference code generated for the language of the conference establishment user is determined as the unique identification code.

The conference establishment user may be, for example, a user reserving a conference, or a user initiating a conference.

It should be noted that, when establishing a multimedia conference, a target conference code matching the language of the conference establishing user is generated. Since the language used by a conference participant usually is the same as that used by the conference establishing user, the target conference code is applicable to the whole multimedia conference, thereby reducing the number of times of generating conference codes for the multimedia conference, and reducing the amount of computation caused by generating the conference codes.

In some embodiments, the above target users include a user to be invited.

In some embodiments, before the step 101, the method may further include: obtaining predefined scenario information of the user to be invited, in response to receiving a conference invitation request including an identifier of the user to be invited. It should be noted that when the invitator sends an invitation request to the first executing subject, the first executing subject trys to obtain the predefined language indication information of the user to be invited.

The above step 101 may include: determining a language corresponding to the predefined language indication information of the user to be invited as a second language in response to obtaining predefined language indication information of the user to be invited; and determining a second conference code matching the second language. In this case, the second conference code is used to join the multimedia conference.

In some embodiments, the determining a second conference code matching the second language includes: determining, in response to determining that a generated conference code matching the second language has been generated, the generated conference code as the second conference code.

In some application scenarios, conference codes for various supported languages may be generated in advance. Then, after determining the second language, the generated conference code for the second language can be quickly obtained, and then sent to the users to be invited.

In some application scenarios, the user to be invited may use the same language as the conference establishment user. Therefore, the conference code generated for the conference establishment user may be sent to the user to be invited as the second conference code.

In some application scenarios, the user to be invited may use the same language as a user previously invited. Therefore, the conference code generated for the user previously invited may be sent to the user to be invited as the second conference code.

In some embodiments, the determining a second conference code matching the second language includes: generating the second conference code matching the second language in response to determining that no generated conference code matching the second language exists.

It should be noted that, by determining the generated conference code as the second conference code, firstly the speed of generating the second conference code can be improved, that is, the speed of the user to be invited receiving the second conference code. Secondly, it is ensured that the conference codes used by users of the same language in the same multimedia conference are the same, reducing the consumption of available conference codes.

The step 101 may include: generating a third conference code matching a preset universal language in response to failing to obtain the predefined language indication information of the user to be invited; and sending the third conference code to the user to be invited. The third conference code is used to join the multimedia conference.

There are many ways to invite users to join the multimedia conference.

Optionally, the user who initiates the invitation may select an associated user from the client of the multimedia conference as the user to be invited. In this case, since the user to be invited is a user having an account of the client of the multimedia conference, the first execution subject can determine the target language of the user to be invited.

Optionally, the user who initiates the invitation may select a user from accounts in another client (such as an email number, a mobile phone number) as the user to be invited. In this case, since the user to be invited may not have an account of the client of the multimedia conference, there is no information about the user to be invited in the account system of the first execution subject, so that the first execution subject may not obtain the predefined language indication information of the user to be invited.

The default universal language may be a preset language that is possiblely accepted by users of various languages. As an example, the default universal language may be English.

The generating a third conference code matching a preset universal language may include any one of: determining a generated conference code matching the preset universal language as the third conference code to be sent to the user to be invited; and generating a third conference code matching the preset universal language.

It should be noted that when the language used by the user to be invited cannot be determined, sending the third conference code in the universal language to the user to be invited can reduce the difficulty of joining the conference due to language differences and improve the speed of users joining the multimedia conference.

It should be noted that no matter which language is used as the target language, the target conference code matching the target language can by generated by the process shown in FIG. 2. In other words, the process shown in FIG. 2 can be used to generate the first conference code matching the first language, the second conference code matching the second language, and the third conference code matching the preset universal language.

Figure 3:
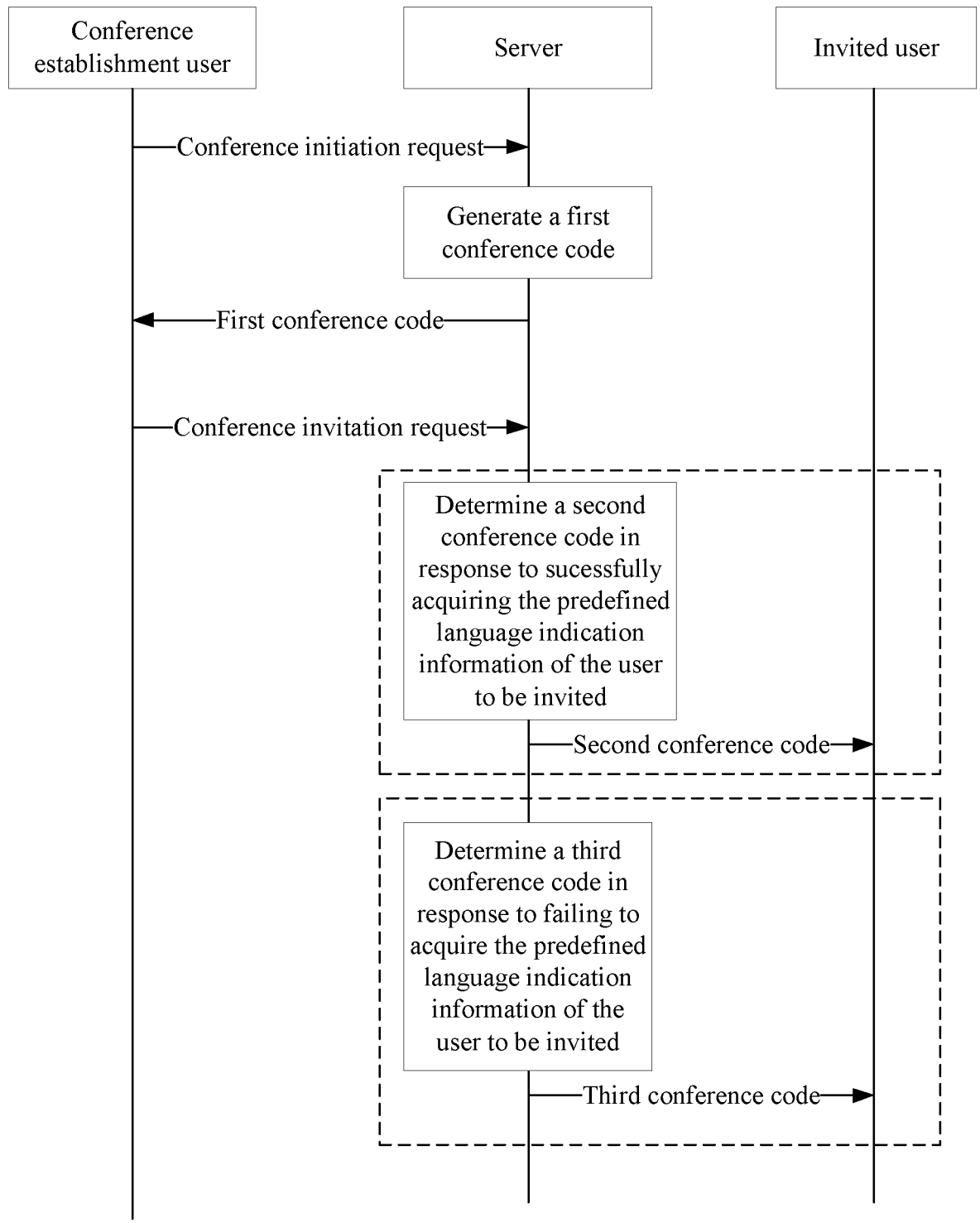
FIG. 3 is a signaling diagram according to an exemplary application scenario of the present disclosure.

FIG. 3 shows an exemplary application scenario according to an embodiment in the present disclosure.

The conference establishment user (such as user A) may send a conference initiation request to the server.

The server then generates a first conference code matching the language used by the conference establishment user in response to receiving the conference initiation request, and return the first conference code to the conference establishment user.

Then, the conference establishing user or an invitation initiating user (not shown in the figure) who is not the conference establishing user may send a conference invitation request to the server. The conference invitation request may include an identifier of a user to be invited. As an example, user A is a conference establishment user. Although user B who has joined the conference is not the conference establishment user, user B can also act as the invitation initiating user to invite the user to be invited.

Then, the server acquires the predefined language indication information of the user to be invited in response to the conference invitation request. If the predefined language indication information is acquired successfully, the server determines the second language of the user to be invited, generates a second conference code matching the second language, and sends the second conference code to the user to be invited.

Optionally, if failing to acquiring the predefined language indication information, the server determines a third conference code matching a preset universal language, and sends the third conference code to the user to be invited.

It should be noted that for the same user to be invited, steps in only one of the two dotted boxes in FIG. 3 is performed.

Figure 4:
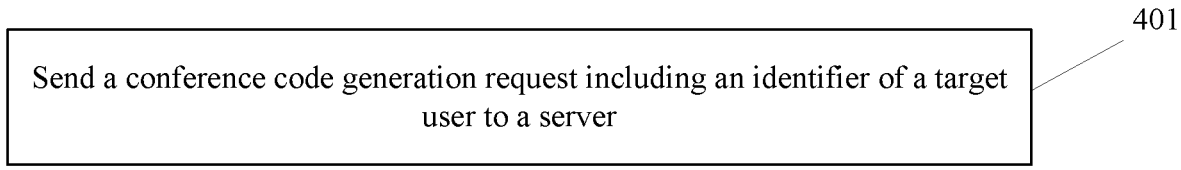
FIG. 4 is a flowchart of another interaction method according to an embodiment of the present disclosure.

FIG. 4 shows a flowchart of another interaction method according to an embodiment of the present disclosure. The interaction method is applied to the terminal device. As shown in FIG. 1, the interaction method includes the following step 401.

Step 401: Send a conference code generation request including an identifier of a target user to a server.

In this embodiment, a second execution subject of the interaction method (such as the terminal device) may send a conference code generation request including the identifier of the target user to the server.

It should be noted that the second execution subject may be an electronic device used by the conference establishment user, or an electronic device used by the user who invites other users to join the multimedia conference.

The above conference code generation request is used to request to generate a conference code for a multimedia conference. It can be understood that the conference code generation request may be any request that can be used to request the server to generate a conference code.

In some embodiments, the conference code generation request may include, but is not limited to, any one of a conference establishment request and a conference invitation request.

The conference establishment request is used to request establishment of a multimedia conference.

The conference invitation request is used to request to send conference information to a user to be invited.

When the server receives the conference establishment request or conference invitation request, the server generates a target conference code for the target user.

The server sends the target conference code to the target user

A target language is determined according to the target user. The target conference code matches the target language.

In some embodiments, the server may perform the following first generation step: determining a first language according to predefined scenario information of the conference establishment request, and generating a first conference code matching the first language. The first conference code is used to request to join the target multimedia conference.

In some embodiments, the target user includes the user to be invited, and the method further includes sending a conference invitation request including an identifier of the user to be invited to the server. In this case, the server may perform the following second generation step: determining a second language corresponding to predefined scenario information in response to obtaining the predefined scenario information of the user to be invited, determining a second conference code matching the second language, and sending the second conference code to the user to be invited. In this case, the second conference code is used to join the target multimedia conference.

In some embodiments, the determining a second conference code matching the second language in the second generation step includes: determining the first conference code as the second conference code in response to a fact that the second language is the same as the first language.

In some embodiments, the server may perform the following third generation step: generating a third conference code matching a preset universal language in response to failing to obtain the predefined scene information of the user to be invited, and sending the third conference code to the user to be invited. In this case, the third conference code is used to join the target multimedia conference.

It should be noted that, for the technical effects and implementation details in the embodiment as shown FIG. 4, reference may be made to relevant description of other embodiments, which will not be repeated here.

Figure 5:
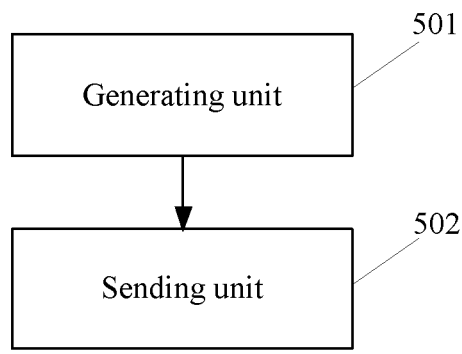
FIG. 5 is a schematic diagram of an interaction apparatus according to an embodiment of the present disclosure.

Referring to FIG. 5, as an implementation of the methods shown in the above figures, the present disclosure provides an embodiment of an interaction apparatus, which corresponds to the method embodiment shown in FIG. 1. The device may be specifically applied to various electronic devices.

As shown in FIG. 5, the interaction apparatus of this embodiment includes: a generating unit 501 and a sending unit 502. The generating unit 501 is configured to generate a target conference code matching a target language, where the target language is determined according to a target user, and the target conference code indicates a multimedia conference. The sending unit 502 is configured to send the target conference code to the target user.

In this embodiment, for the specific processing of the generating unit 501 and the sending unit 502 of the interaction apparatus and the technical effect thereof, reference may be made to the relevant description of step 101 in the embodiment as shown in FIG. 1, which will not be repeated here.

In some embodiments, the generating a target conference code matching a target language includes: generating a candidate conference code matching the target language; determining whether the candidate conference code meets a preset condition; and determining the candidate conference code as the target conference code in response to determining that the candidate conference code meets the preset condition.

In some embodiments, the preset condition includes a duplicate data exclusion condition, and the determining whether the candidate conference code meets a preset condition includes: determining that the candidate conference code meets the duplicate data exclusion condition, in response to determining that the candidate conference code is different from each existing conference code.

In some embodiments, the preset condition includes a prohibited word exclusion condition, and the determining whether the candidate conference code meets a preset condition includes: determining that the candidate conference code meets the prohibited word exclusion condition, in response to determining that the candidate conference code is not in a list of prohibited words corresponding to the target language.

In some embodiments, the generating a target conference code matching a target language includes: selecting a target language feature category corresponding to a target conference feature category from at least one language feature category preset for the target language, where the language feature category includes feature items, the target conference feature category is a category to which a target conference feature of the multimedia conference belongs; selecting a target feature item corresponding to the target conference feature from the target language feature category; and generating a target conference code having the target feature item.

In some embodiments, the target language is determined according to predefined language indication information of the target user.

In some embodiments, the target user includes a conference establishment user, and a language determined according to the conference establishment user is a first language and the target language determined by the conference establishment user is the first language; and the generating a target conference code matching a target language includes: generating a first conference code matching the first language in response to receiving a conference establishment request, where the first conference code indicates the multimedia conference.

In some embodiments, the target user includes a user to be invited; and before generating the target conference code matching the target language, the device is further configured to obtain predefined language indication information of the user to be invited, in response to receiving a conference invitation request including an identifier of the user to be invited. The generating a target conference code matching a target language includes: determining a language corresponding to the predefined language indication information of the user to be invited as a second language, in response to obtaining the predefined language indication information of the user to be invited; and determining a second conference code matching the second language, where the second conference code is used to join the multimedia conference.

In some embodiments, the determining a second conference code matching the second language includes: determining, in response to determining that a generated conference code matching the second language has been generated, the generated conference code as the second conference code.

In some embodiments, the device is configured to generate a third conference code matching a preset universal language in response to failing to obtain the predefined language indication information of the user to be invited; and send the third conference code to the user to be invited, where the third conference code is used to join the multimedia conference.

Figure 6:
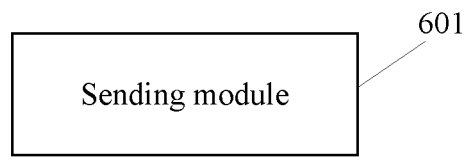
FIG. 6 is a schematic diagram of another interaction apparatus according to an embodiment of the present disclosure.

Referring to FIG. 6, as an implementation of the methods shown in the above figures, the present disclosure provides an embodiment of an interaction apparatus, which corresponds to the method embodiment shown in FIG. 1. The device may be specifically applied to various electronic devices.

As shown in FIG. 6, the interaction apparatus of this embodiment includes a sending unit 601. The sending unit is configured to send a conference code generation request including an identifier of a target user to a server, where the conference code generation request is used to request generation of a target conference code indicating a multimedia conference. The server sends the target conference code to the target user, and the target conference code matches a target language determined according to the target user.

In this embodiment, for the specific processing and the technical effect of the transmission unit 601 of the interaction apparatus, reference may be made to the relevant description of step 401 in the embodiment as shown in FIG. 4, which will not be repeated here.

In some embodiments, the target user includes a conference setup user, and the conference code generation request includes a conference establishment request. The device is also configured to send a conference establishment request to the server. The server generates a first conference code matching the first language in response to receiving the conference establishment request, where the first language is determined according to the conference establishment user, and the first conference code indicates a multimedia conference.

In some embodiments, the target user includes the user to be invited, and the conference code generation request includes the conference invitation request. The device is further configured to: send a conference invitation request including an identity of the user to be invited to the server. The server, in response to obtaining predefined scene information of the user to be invited, determines a second language corresponding to the predefined scene information, determines a second conference code matching the second language, and sends the second conference code to the user to be invited. The second conference code is used to join the multimedia conference.

In some embodiments, the determining a second conference code matching the second language includes: determining, in response to determining that a generated conference code matching the second language has been generated, the generated conference code as the second conference code.

In some embodiments, the server generates a third conference code matching a preset universal language in response to failing to obtain the predefined scenario information of the user to be invited, and sends the third conference code to the user to be invited. The third conference code is used to join the multimedia conference.

Figure 7:
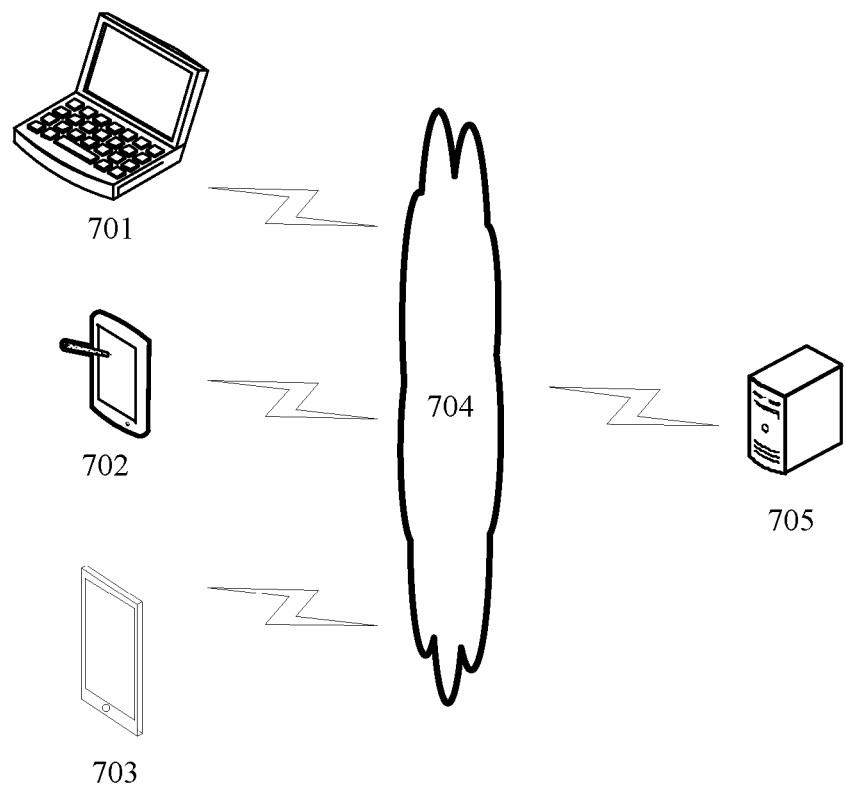
FIG. 7 is an exemplary system architecture for applying the interaction method of according to an embodiment of the present disclosure.

FIG. 7 shows an exemplary system architecture for applying the interaction method of according to an embodiment of the present disclosure.

As shown in FIG. 7, the system architecture includes terminal devices 701, 702 and 703, a network 704, and a server 705. The network 704 is medium for providing communication links between the server 705 and the terminal devices 701, 702 and 703. The network 704 may be implemented into various connection types, such as wired, wireless communication links, optical fiber cables, and the like.

The terminal devices 701, 702 and 703 may interact with the server 705 through the network 704 to receive or send messages. The terminal devices 701, 702 and 703 may be installed with various client applications, such as web browser applications, search applications, and news and information applications. The client applications in the terminal devices 701, 702 and 703 may receive user instructions and perform functions according to the user instructions, such as adding information according to a user instruction.

The terminal devices 701, 702 and 703 may be implemented in hardware or software. When being implemented in hardware, the terminal devices 701, 702 and 703 may be various electronic devices having display screens and supporting web browsing, including but not limited to smart phones, tablet computers, e-book readers, MP3 (Moving Picture Experts Group Audio Layer III) players, MP4 (Moving Picture Experts Group Audio Layer IV) players, laptop computers, desktop computers, or the like. When being implemented in software, the terminal devices 701, 702 and 703 may be installed in the electronic devices listed above. The software may be implemented as multiple software or software modules (such as software or software modules used to provide distributed services), or as a single software or software module, which are not limited herein.

The server 705 may be a server providing various services, for example, receiving information acquisition requests sent by the terminal devices 701, 702 and 703, and acquiring display information corresponding to the information acquisition requests in various ways according to the information acquisition request, and sending relevant data of the display information to the terminal devices 701, 702 and 703.

It should be noted that the interaction method provided by the embodiments of the present disclosure may be executed by the terminal device. Accordingly, the interaction apparatus can be arranged in the terminal devices 701, 702 and 703. In addition, the interaction method provided by the embodiments of the present disclosure may be executed by the server 705. Accordingly, the interaction apparatus may be arranged in the server 705.

It should be understood that the number of terminal devices, networks and servers in FIG. 7 is only schematic. According to the implementation requirements, any numbers of terminal devices, networks and servers may be provided.

Figure 8:
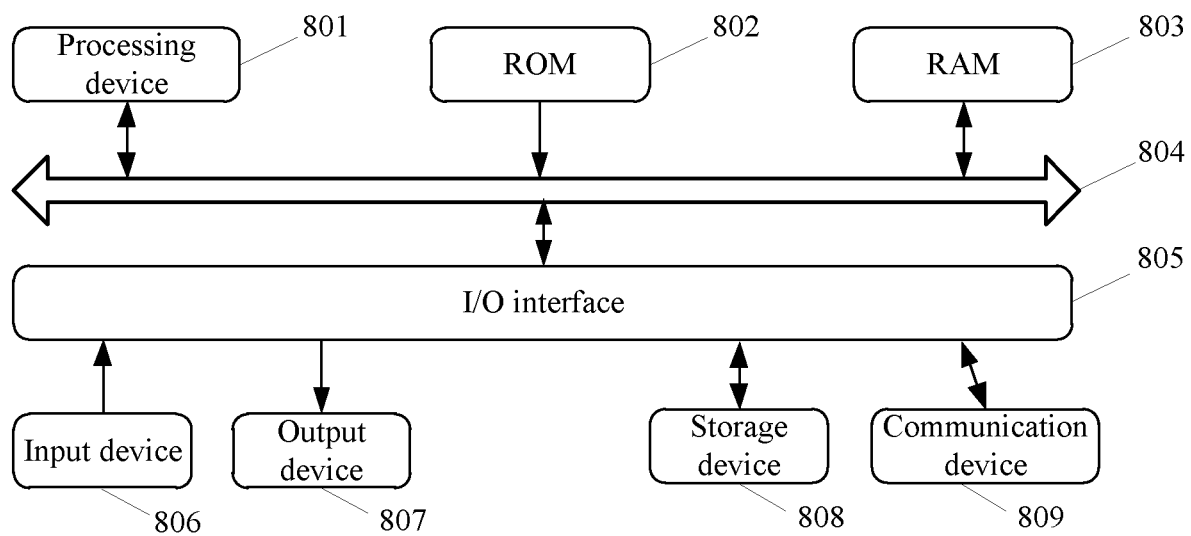
FIG. 8 is a schematic diagram of a basic structure of an electronic device according to an embodiment of the present disclosure.

FIG. 8 shows a schematic structural diagram of an electronic device (for example, the terminal devices and server in FIG. 7) suitable for implementing the embodiments of the present disclosure. Terminal devices in the embodiments of the present disclosure may include, but are not limited to, mobile terminals, such as mobile phones, notebook computers, digital broadcast receivers, PDAs (Personal Digital Assistants), PADs (Tablet computers), PMPs (Portable Multimedia Players), vehicle-mounted terminals (such as in-vehicle navigation terminals), and the like, and fixed terminals such as digital TVs, desktop computers, and the like. The electronic device shown in FIG. 8 is only an example, and should not impose any limitation on the functions and applications of the embodiments of the present disclosure.

As shown in FIG. 8, the electronic device 800 may include a processing device (such as a central processing unit, a graphics processor) 801 that may execute various appropriate actions and processes according to a program stored in a read only memory (ROM) 802 or loaded into a random access memory (RAM) 803 from a storage device 808. In the RAM 803, various programs and data necessary for the operation of the electronic device 800 are also stored. The processing device 801, the ROM 802, and the RAM 803 are connected to each other through a bus 804. An input/output (I/O) interface 805 is also connected to the bus 804.

Normally, the following devices may be connected to the I/O interface 805: an input device 806 such as a touch screen, a touchpad, a keyboard, a mouse, a camera, a microphone, an accelerometer, a gyroscope and the like; an output device 807, such as a liquid crystal display (LCD), a speaker, a vibrator and the like; a storage device 808, such as a magnetic tape, a hard disk and the like; and a communication device 809. The communication device 809 may enable the electronic device to communicate in a wireless or wired manner with other devices to exchange data. Although FIG. 8 shows the electronic device having various means, it should be understood that not all of the illustrated means are required to be implemented or provided. More or fewer devices may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer readable medium. The computer program includes program code for performing the method illustrated in the flowchart. In such an embodiment, the computer program may be downloaded and installed from the network via the communication device 809, or from the storage device 808, or from the ROM 802. When the computer program is executed by the processing device 801, the above-mentioned functions in the methods of the embodiments of the present disclosure are executed.

It should be noted that the computer-readable medium mentioned above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. More specific examples of computer readable storage media may include, but are not limited to, electrical connections with one or more wires, portable computer disks, hard disks, a random access memory (RAM), a read only memory (ROM), an erasable Programmable read only memory (EPROM or flash memory), a optical fiber, a portable compact disk read only memory (CD-ROM), optical storage devices, magnetic storage devices, or any suitable combination thereof. In this disclosure, a computer-readable storage medium may be any tangible medium that contains or stores a program that can be used by or in conjunction with an instruction execution system, apparatus or device. In the present disclosure, a computer-readable signal medium may include a data signal propagated in baseband or as part of a carrier wave with computer-readable program code embodied thereon. Such propagated data signals may be in a variety of forms, including but not limited to electromagnetic signals, optical signals, or any suitable combination thereof. A computer-readable signal medium can also be any computer-readable medium other than a computer-readable storage medium that can transmit, propagate, or transport the program for use by or in connection with the instruction execution system, apparatus or device. Program code stored on a computer readable medium may be transmitted using any suitable medium including, but not limited to, an electrical wire, an optical fiber cable, RF (radio frequency), or any suitable combination thereof.

In some embodiments, the client and server may use any currently known or future network protocol such as HTTP (HyperText Transfer Protocol) to communicate, and may be connected with digital data network in any form or medium (such as a communication network). Examples of communication networks include local area networks (LAN), wide area networks (WAN), the Internet (eg, the Internet), and peer-to-peer networks (such as ad hoc peer-to-peer networks), as well as any current or future network.

The above-mentioned computer-readable medium may be included in the above-mentioned electronic device, or may exist alone without being assembled into the electronic device.

The above-mentioned computer-readable medium carries one or more programs. The above-mentioned one or more programs, when being executed by the electronic device, cause the electronic device to: generate a target conference code matching a target language, where the target language is determined according to a target user, and the target conference code indicates a multimedia conference; and send the target conference code to the target user.

The above-mentioned computer-readable medium carries one or more programs. The above-mentioned one or more programs, when being executed by the electronic device, cause the electronic device to: sending a conference code generation request including an identifier of a target user to a server, where the conference code generation request is used to request generation of a target conference code indicating a multimedia conference, where the server sends the target conference code to the target user, the target conference code matches a target language determined according to the target user.

Computer program code for performing operations of the present disclosure may be written in one or more programming languages, including but not limited to object-oriented programming languages, such as Java, Smalltalk, C++, and conventional procedural programming languages, such as the "C" language or similar programming languages. The program code may be executed entirely on a user computer, or partly on a user computer, or as a stand-alone software package, or partly on a user computer and partly on a remote computer, or entirely on a remote computer or server. In the case of using a remote computer, the remote computer may be connected to the user's computer through any kind of network, including a local area network (LAN) or a wide area network (WAN), or may be connected to an external computer (e.g., using Internet connection provided by an Internet service provider).

The flowchart and block diagrams in the figures illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the figures. For example, two blocks shown in succession may be executed substantially concurrently, or the blocks may sometimes be executed in the reverse order, depending upon the functionality involved. It is also noted that each block of the block diagrams and/or flowchart illustrations, and combinations of blocks in the block diagrams and/or flowchart illustrations, may be implemented in dedicated hardware-based systems that perform the specified functions or operations, or may be implemented by a combination of dedicated hardware and computer instructions.

The units involved in the embodiments of the present disclosure may be implemented in a software manner, or in a hardware manner. The name of the unit does not constitute a limitation of the unit under any circumstances. For example, the sending unit may be described as a unit for sending a request.

The functions described above may be performed, at least in part, by one or more hardware logic components. For example, without limitation, examples of hardware logic components that may be used include: a Field Programmable Gate Array (FPGA), a Application Specific Integrated Circuit (ASIC), an Application Specific Standard Product (ASSP), a System on Chip (SOC), a Complex Programmable Logical Device (CPLD) and the like.

In the present disclosure, a machine-readable medium may be a tangible medium that may contain or store a program for use by or in connection with the instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, devices, or devices, or any suitable combination thereof. More specific examples of machine-readable storage media include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination thereof.

The above merely describes preferred embodiments of the present disclosure and illustrates the technical principles. Those skilled in the art should understand that the scope of the disclosure is not limited to the technical solutions formed by the specific combination of the above-mentioned technical features, and should also cover, without departing from the above disclosed concept, the technical solutions formed by any combination of the above-mentioned technical features or other equivalent features. For example, a technical solution may be formed by replacing a feature with another feature having similar function disclosed in the present disclosure (but not limited to).

It should be noted that although the above operations are described in a specific order, it should not be understood that these operations are required to be performed in the specific order or performed in a sequential order. Under certain circumstances, multitasking and parallel processing may be advantageous. Although multiple implementation details are included in the above descriptions, the details should not be interpreted as limitations to the scope of the present disclosure. The features described in multiple separate embodiments may be implemented in combination in a separate embodiment. Conversely, the features described in a separate embodiment may be implemented in multiple embodiments individually or in any suitable sub-combination.

Although the subject matter has been described in language specific to structural features and/or logical actions of the method, it should be understood that the subject matter defined in the appended claims are unnecessarily limited to the specific features or actions described above. The specific features and actions described above are merely exemplary forms of implementing the claims.

The invention claimed is:

1. A method of generating a target conference code indicative of a multimedia conference, comprising:
   receiving a request for creating the multimedia conference or an invitation request of the multimedia conference, wherein the request or the invitation request comprises information identifying a target user;
   obtaining predefined language indication information of the target user based on an identifier of the target user;
   generating the target conference code matching a target language, wherein the target language is determined according to the target user, wherein the target conference code indicates the multimedia conference, wherein the target conference code is configured to enable the target user to join the multimedia conference, wherein the target conference code excludes prohibited words, and wherein the generating the target conference code matching the target language comprises:
      determining a language corresponding to the predefined language indication information of the target user as a second language, and
      determining a second conference code matching the second language as the target conference code;
   sending the target conference code to the target user, wherein the target user is capable of joining the multimedia conference by using the target conference code; and
   wherein the method further comprises:
   generating a third conference code matching a preset universal language as the target conference code in response to failing to obtain the predefined language indication information of the target user.

2. The method according to claim 1, wherein the generating the target conference code matching a target language comprises:
generating a candidate conference code matching the target language;
determining whether the candidate conference code meets a preset condition; and
determining the candidate conference code as the target conference code in response to determining that the candidate conference code meets the preset condition.

3. The method according to claim 2, wherein the preset condition comprises a duplicate data exclusion condition; and
the determining whether the candidate conference code meets a preset condition comprises:
determining that the candidate conference code meets the duplicate data exclusion condition, in response to determining that the candidate conference code is different from each existing conference code.

4. The method according to claim 2, wherein the preset condition comprises a prohibited word exclusion condition; and
the determining whether the candidate conference code meets a preset condition comprises:
determining that the candidate conference code meets the prohibited word exclusion condition, in response to determining that the candidate conference code is not in a list of prohibited words corresponding to the target language.

5. The method according to claim 1, the generating the target conference code matching a target language comprises:
selecting a target language feature category corresponding to a target conference feature category from at least one language feature category preset for the target language, wherein the language feature category comprises feature items, the target conference feature category is a category to which a target conference feature of the multimedia conference belongs;
selecting a target feature item corresponding to the target conference feature from the target language feature category; and
generating a target conference code having the target feature item.

6. The method according to claim 1, wherein the target user comprises a conference establishment user, and a language determined according to the conference establishment user is a first language; and
the generating the target conference code matching a target language comprises:
generating a first conference code matching the first language in response to receiving a conference establishment request, wherein the first conference code indicates the multimedia conference.

7. The method according to claim 1, wherein the determining a second conference code matching the second language comprises:
determining, in response to determining that a generated conference code matching the second language has been generated, the generated conference code as the second conference code.

8. A non-transitory computer-readable storage medium, storing computer instructions, wherein the computer instructions, when being executed by a processor, cause the processor to perform the method according to claim 1.

9. A method of generating a target conference code indicative of a multimedia conference, comprising:
sending a conference code generation request including an identifier of a target user to a server, wherein the conference code generation request comprises a request for creating the multimedia conference or an invitation request of the multimedia conference, wherein the conference code generation request is configured to request generation of the target conference code indicating the multimedia conference, wherein the server generates and sends the target conference code to the target user, wherein the target conference code excludes prohibited words,
wherein the server obtains predefined language indication information of the target user based on the identifier of the target user, determines a language corresponding to the predefined language indication information of the target user as a second language, determines a second conference code matching the second language as the target conference code,
wherein the server generates a third conference code matching a preset universal language as the target conference code in response to failing to obtain the predefined language indication information of the target user,
wherein the target user is capable of joining the multimedia conference by using the target conference code, wherein the target conference code matches a target language determined according to the target user, and wherein the target conference code is configured to enable the target user to join the multimedia conference.

10. The method according to claim 9, wherein the target user comprises a conference establishment user, and the conference code generation request comprises a conference establishment request; and
the method further comprises:
sending the conference establishment request to the server, wherein the server generates a first conference code matching a first language in response to receiving the conference establishment request, the first language is determined according to the conference establishment user, and the first conference code indicates the multimedia conference.

11. The method according to claim 9, wherein the second conference code matching the second language is determined by:
determining, in response to determining that a generated conference code matching the second language has been generated, the generated conference code as the second conference code.

12. An interaction apparatus, comprising:
at least one processor; and
at least one memory communicatively coupled to the at least one processor and storing instructions that upon execution by the at least one processor cause the apparatus to perform the method according to claim 9.

13. A non-transitory computer-readable storage medium, storing computer instructions, wherein the computer instructions, when being executed by a processor, cause the processor to perform the method according to claim 9.

14. An interaction apparatus of generating a target conference code indicative of a multimedia conference, comprising:
at least one processor; and at least one memory communicatively coupled to the at least one processor and storing instructions that upon execution by the at least one processor cause the apparatus to:

receive a request for creating the multimedia conference or an invitation request of the multimedia conference, wherein the request or the invitation request comprises information identifying a target user;

obtain predefined language indication information of the target user based on an identifier of the target user;

generate the target conference code matching a target language, wherein the target language is determined according to the target user, wherein the target conference code indicates the multimedia conference, wherein the target conference code is configured to enable the target user to join the multimedia conference, wherein the target conference code excludes prohibited words, and wherein generating the target conference code matching the target language comprises:
  determining a language corresponding to the predefined language indication information of the target user as a second language, and
  determining a second conference code matching the second language as the target conference code;

send the target conference code to the target user, wherein the target user is capable of joining the multimedia conference by using the target conference code; and wherein the instructions that upon execution by the at least one processor further cause the apparatus to:

generate a third conference code matching a preset universal language as the target conference code in response to failing to obtain the predefined language indication information of the target user.

\* \* \* \* \*